United States Patent [19]

Holland

[11] Patent Number: 5,662,801
[45] Date of Patent: *Sep. 2, 1997

[54] METHOD OF REMOVING ORGANIC COMPOUNDS FROM AIR AND WATER COLUMNS

[76] Inventor: Herbert W. Holland, 2314 Chimney Rock, Houston, Tex. 77056

[*] Notice: The portion of the term of this patent subsequent to Jun. 28, 2011, has been disclaimed.

[21] Appl. No.: 663,156

[22] PCT Filed: May 8, 1995

[86] PCT No.: PCT/US95/05629

§ 371 Date: Nov. 27, 1995

§ 102(e) Date: Nov. 27, 1995

[87] PCT Pub. No.: WO95/30628

PCT Pub. Date: Nov. 16, 1995

[51] Int. Cl.$^6$ .................................................. C02F 1/28
[52] U.S. Cl. ................. 210/266; 210/282; 210/290; 210/799; 210/924
[58] Field of Search ........................... 210/283, 284, 210/266, 282, 290, 688, 690, 691, 692, 693, 694, 799

[56] References Cited

U.S. PATENT DOCUMENTS

| | | | |
|---|---|---|---|
| 2,545,239 | 3/1951 | McQuiston, Jr. et al. | 210/688 |
| 3,429,808 | 2/1969 | Smith | 210/688 |
| 4,011,159 | 3/1977 | Stein et al. | 210/40 |
| 4,061,573 | 12/1977 | Biron | 210/924 |
| 4,111,813 | 9/1978 | Preus | 210/282 |
| 4,497,712 | 2/1985 | Cowling | 210/691 |
| 4,534,865 | 8/1985 | Sundberg et al. | 210/692 |
| 4,775,473 | 10/1988 | Johnson et al. | 210/484 |
| 5,071,564 | 12/1991 | Stein et al. | 210/680 |
| 5,324,429 | 6/1994 | Holland | 210/484 |
| 5,360,579 | 11/1994 | Duquenne | 252/329 |
| 5,374,600 | 12/1994 | Hozumi et al. | 502/402 |
| 5,458,773 | 10/1995 | Holland | 210/282 |
| 5,462,785 | 10/1995 | Holland | 428/76 |
| 5,518,797 | 5/1996 | Holland | 428/132 |
| 5,527,457 | 6/1996 | Holland | 210/170 |
| 5,547,313 | 8/1996 | Holland | 485/63 |
| 5,566,731 | 10/1996 | Holland | 141/86 |
| 5,588,785 | 12/1996 | Holland | 405/270 |

*Primary Examiner*—Cynthia L. Nessler

[57] ABSTRACT

A method for the removal of organic compounds from columns of air or water. The method utilizes a solidifying organic polymer-based filtration media and activated carbon placed in separate containers and arranged in an in-line, two phase process to extract organic compounds and metals from feed streams containing emulsified or suspended concentrations of organic contaminants by absorbing and solidifying the organics into an easily retrievable, disposable mass. The treated feed streams exit the process containing acceptable limits of the organic compounds and metals within the fluid columns to permit their free release into the environment.

2 Claims, 1 Drawing Sheet

METHOD OF REMOVING ORGANIC COMPOUNDS FROM AIR AND WATER COLUMNS

BACKGROUND OF THE INVENTION

The present invention relates to the removal of organic compounds from columns of air or water.

Currently, the most common methods of managing contaminated air and water columns utilize sorbent filtering devices comprised of non-woven fabric materials, such as polypropylene, or relying on filtration systems utilizing activated carbon to remove the organic compound pollutants from the candidate feed streams. For a variety of reasons, the effectiveness of these methods ranges from marginal to unsatisfactory.

The exertion of only a small amount of pressure is required to release the contaminants from the spent non-woven textile devices, making this option a messy and labor intensive means of dealing with the polluted feed streams. It also presents a problem when addressing the issue of disposal of the non-woven textile sorbent devices and the sorbed organics.

Activated carbon is also used to extract organic compounds from fluid columns. Feed streams containing organic compounds tend to glaze the surface of the activated carbon with a coat of the organic pollutants, reducing the rate of absorption and the effectiveness of the carbon as a filtration media. This results in the carbon filtration media being frequently replaced, thus increasing costs associated with the extraction of the organic compounds from the feed streams and generating a large volume of contaminated filtration media for processing and disposal.

In many instances, these methods of dealing with organic compound pollutants result merely in the contaminants being transferred to a different environment, where they must once again be processed for disposal.

The prior art methods of dealing with organic contaminants in air and water columns are harmful to the environment in that the issue of proper disposal of the free flowing contaminants after filtration remains. The use of sorbent devices is labor intensive, time consuming, messy and often results in the sorbed pollutants being disposed of in a landfill or creating expensive disposal problems. The free release of pollutants into a landfill facility accomplishes little more than converting the pollutant from an air or water borne contaminant into a land contaminant.

SUMMARY OF THE INVENTION

In accordance with the present invention, a process for removing organic compounds and suspended metals from columns of air or water utilizes a solidifying organic polymer. Optionally, activated carbon may be placed in a separate filter container and configured in an in-line filtration system with the solidifying polymer. The organic compounds and some metals are absorbed from the contaminated fluid column as it passes through a stratified arrangement of packaged organic solidifying polymer in a container. The fluid column is then introduced to a second container enclosing a stratified arrangement of activated carbon where it extracts any remaining metals and "polishes" the feed stream.

In accordance with the present invention, a method is provided which will not only extract organic compounds from polluted air and water columns, but will also quickly and irreversibly absorb and solidify the organics into an easily retrievable, solid rubber-like mass. The solidified organic compounds will not leach when exposed to pressure limits currently used to determine landfill acceptability. Additionally, the solidified organics may be incinerated as fuel for their BTU content, or used as a component in the production of asphalt, roofing material or other tar-like compounds.

As such, the solidified mass eliminates the storage and mass transfer concerns associated with contaminated fluid columns, thus substantially reducing capital and operating costs associated with existing methods of dealing with contaminated fluids columns.

The present method utilizes a system wherein a feed stream containing organic contaminants is exposed to a plurality of stratified layers of filtration media, each layer containing an organic solidifying polymer. The polymer has the property of solidifying organic compounds and metals it comes in contact with. The solidifying polymer is packaged and/or blended and arranged to prevent any incidence of surface blockage that may occur as the organic contaminants are absorbed and solidified. After the feed stream has been exposed to the solidifying polymer, and the free floating, suspended or emulsified organics and suspended metals have been extracted from it by absorbing and solidifying the contaminants as they come in contact with the polymer filtration media, the fluid column may then be exposed to an amount of activated carbon. The exposure of the feed stream to the activated carbon "polishes" the air or water column as it is filtered through the stratified arrangement of activated carbon. The polishing process removes any additional metals and contaminants that may remain in the feed stream.

Alternate layers comprised of coalescing material may be included to enhance the effectiveness of the filtration media in extracting organics from the feed stream.

The solidifying polymer may be packaged for use in this process in several ways. Measured amounts of the polymer may be sealed within small, individual bags composed of a single, thin layer of textile material. The polymer may also be suspended within the fibers of the textile material or blended with other types of filtration media or coalescing materials.

A first arrangement of the polymer as a filtration media calls for the solidifying polymer to be encased and sealed within individual bags of single layer textile material. Each bag, filled with a measured amount of the solidifying polymer, is sealed to form a solitary chamber of solidifying polymer within a single layer envelope of textile material. The seaming of the textile material to seal the polymer material inside the individual polymer-filled bags utilized by this packaging method may be accomplished by several means including mechanical stitching, thermal sealing and ultra-sonic fusing. Individual polymer-filled bags are then placed in a stratified arrangement within a filtering container.

A second packaging of the polymer as a filtration media polymer has the solidifying polymer suspended within the fibers of a textile material as they are being formed, or attached to the textile material. The suspending of the polymer within the fibers of textile material may be accomplished by incorporating the polymer into the body of the fabric as the textile material is formed. This process is normally used in the production of melt-blown or spun-bonded textiles.

The manufacturing of a synthetic textile fabric material starts with raw petro-chemical based pellets, such as polypropylene, being blended with pigments and/or additives. This mixture is heated to the melting point of the pellets and extruded into filaments. The filaments are drawn and attenuated, using high velocity air to align the polymer molecules of the fabric and maximize fiber strength. The resulting continuous, high tenacity filaments are formed into a web on a moving conveyor screen and thermally fused together with a bonding system to maximize the strength and surface stability of the fabric.

The solidifying polymer may be suspended within the fabric by adding it to the mix of raw petro-chemical based pellets, pigments and additives, melting the mixture and extruding filaments from the mixture. This method incorporates the polymer into the body of the filaments as they are formed. Similarly, the extruded filaments comprised of the solidifying polymer and synthetic textile fabric material may be formed into a solid, wafer-like or disk-like configuration.

The solidifying polymer may also be suspended within the fabric by injecting a preferably evenly distributed amount of the polymer at an intermediate point on the web of filaments as they are formed on the conveyor screen. As the filaments are thermally fused together with the bonding system, the polymer is trapped within the layers of fused filaments, becoming a component of the finished textile fabric material.

A preferably evenly distributed, measured amount of the polymer may also be attached to the textile material by using an adhesive to bond the polymer to a layer of the textile material.

Certain re-cycled plastics may be mixed with the pellets, pigments and additives used in the formation of the filaments of the textile material, eliminating them from landfills and utilizing the re-cycled components in an effective pollution control process.

The polymer suspended within the fibers of textile material may be utilized in a variety of embodiments. The solidifying textile material may be folded and arranged in an accordion-like configuration and packaged as a pleated sheet or cylindrically shaped filtering apparatus. Further, a sheet of the solidifying textile material may be covered with a mesh of coalescing material, such as polyethylene, and rolled into a cylinder. The resulting spiral-like arrangement of alternate layers of the coalescing mesh material and the solidifying textile material, and the pleated packaging of the solidifying textile material serves to efficiently provide maximum surface area contact of the contaminants in the fluid column with the solidifying textile material.

Individual polymer-filled bags, the textile material with the polymer incorporated into the body of its filaments, the textile material holding the polymer within its web of filaments, the textile material bonded to the polymer or loose polymer material stratified between layers of textile material may be arranged in a stratified configuration and joined along the periphery of their stratified arrangement. See U.S. Pat. No. 5,324,429, U.S. patent application Ser. Nos. 08/222, 844, 08/284,010 and 08/347,047, and PCT application PCT/US94/04446.

The polymer may also be blended with absorbent materials such as activated carbon, ground polypropylene fabric material, ground polypropylene rod, or mixed with coalescing materials such as the raw polypropylene pellets utilized in the manufacturing of a synthetic textile fabric materials. In many applications, the blending and mixing of the solidifying polymer with these and other materials results in an effective filtration media.

The individual polymer-filled bags, the textile material with the polymer incorporated into the body of its filaments, the textile material holding the polymer within its web of filaments, the textile material bonded to the polymer, the individual hydrocarbon sorbing and solidifying units formed by a stratified arrangement of textile material and solidifying polymer or the solidifying polymer blended with absorbing or coalescing materials may be placed in a filtering container in a stratified arrangement.

The various embodiments of the previously disclosed filtration media may be stratified within the filtering container between alternate layers of coalescing material. The coalescing layers allow the fluid stream to consolidate after passing through each layer of polymer-based filtration media. This consolidation of the fluid stream allows contaminants remaining in the feed stream to cohesively bond to each other and form larger contaminant particles prior to passing through the next stratified layer of polymer-based filtration media. The larger particles of contaminants are more readily absorbed and solidified as they pass through the polymer-based filtration media, resulting in a more efficient utilization of the polymer-based filtration media and allowing for greater flow rates in the treatment of a contaminated feed stream.

A wide range of materials may be utilized in the formation of the coalescing layers. These materials include an arrangement of synthetic textile material, sand, gravel, foam rubber or the raw petro-chemical based pellets, such as polypropylene, utilized in the manufacturing of a synthetic textile fabric materials.

The arrangement of alternate layers of coalescing layers and polymer-based filtration media results in the solidifying polymer inside the filtering container being stratified and arranged in a plurality of distinct chambers of absorbing and solidifying filtration units, creating a variety of flow channels and consolidating points of the stratified layers. This stratified arrangement is highly effective in extracting free floating and suspended organic contaminants from the feed stream, as well as emulsified organic contaminants found in the fluid column.

The filtering container may be designed to allow the contaminated fluid column to enter at one point and provide maximum surface contact, surface exposure and retention time of the contaminated feed stream with the stratified arrangement of solidifying polymer-based filtration media within the first filtering container, then flow out of said filtering container free of the organic pollutants that entered it as a part of the feed stream. The activated carbon may be placed in a separate filtering container, the intake port of the filtering container containing a stratified arrangement of activated carbon linked to the exhaust port of the filtering container of stratified arrangement of solidifying polymer-based filtration media.

The stratified arrangement of the polymer-based filtration media within the first filtering container creates a series of continuous consolidation points. The textile material absorbs the organic compound on contact. This action, coupled with the continuous consolidation points and the stratification of the textile material and solidifying polymer, speeds migration of the organic contaminants to the solidifying polymer via the capillary attraction of the organics to the textile material as they pass through the flow channels created by the stacked layers. This results in a more uniform distribution of the organic contaminants throughout the entire stratified arrangement of textile material for absorption and solidification of the organic contaminants by the alternating layers of solidifying polymer-based filtration media stratified in layers within the container. The flow channels created by the stratification of the layers of the solidifying polymer-based filtration media serve to significantly diminish the incidence of surface blockage that may occur when a volume of loose, unpackaged polymer is exposed to an organic.

Blending of the solidifying polymer with absorbing materials, coalescing materials and the like, results in a solidifying polymer-based filtration media having similar filtering properties to that of the previously disclosed embodiments of packaging the solidifying polymer in textile material.

In contrast to the stratification concept, the placement of a volume of loose, unpackaged polymer within a filtering container and exposing the loose solidifying polymer to a feed stream of organic contaminants results in a variety of deficiencies in using this method of exposing the solidifying polymer to the organic contaminants.

In one instance, the volume of loose polymer is surrounded by a non-permeable rubber shell due to the extremely rapid reaction between the organics and the solidifying polymer. The resulting surface blockage and the absence of the flow channels serves to restrict, and ultimately prevent, the flow of the feed stream through the filtering container.

Typically, the density and weight of the textile material is substantially less than the density and weight of the textile material used to produce the sorbent devices mentioned as prior art examples. This is preferred in order to reduce the volume of organic compounds that may be retained within the textile material component of the absorbing and solidifying devices utilized by this method. Textile materials fabricated using less dense components characteristically retain a smaller volume of organic compounds within the body of the textile material than those fabricated using heavier textile components of greater density.

Chemical composition, thickness and density of the fibers utilized in the composition of a textile material play a critically governing role in controlling the rate of absorption and the ratio of retention of the organic compounds being sorbed by the material. Textile materials formed by using a greater density of thicker fibers are sturdier, more resistant to tearing and will sorb and retain greater volumes of the organics than textile materials composed of thinner fibers or formed in a less dense configuration. Thus, the migration of the organics throughout the stratified arrangement of polymer and textile material via the capillary attraction of the organic compounds to the textile material remains a characteristic while the level of retention of the organic contaminants is decreased by using a less dense textile material.

The placement of an amount of randomly shaped and sized pieces of activated carbon which may also be stratified within a filtering container between alternate coalescing layers creates numerous flow channels for the feed stream within the container, resulting in an efficient, maximum surface exposure of the contaminated fluid column to the activated carbon.

The various embodiments of the disclosed filtration media and coalescing materials may be sized and packaged to facilitate recharging of a filtering container to achieve the desired stratified arrangement within the filtering container. Various embodiments of solidifying polymer-based filtration media may be placed in a stratified arrangement within the filtering container to treat a contaminated feed stream. A variety of stratified arrangements may be utilized to achieve the desired results when treating specific feed stocks. Multiple filtering containers may be placed in an in-line configuration to gain additional filtration of the feed stream and achieve desired discharge levels. Increased flow rates may be realized by manifolding the filtering containers.

Treated air or water columns may require monitoring of the feed stream prior to its discharge from the final container of the in-line configuration. Monitoring of the fluid columns may be desired to insure the treated feed streams contain acceptable organic compound levels for release into the environment. In the event a fluid column may require additional treatment, it may be returned to the feed stock and reprocessed until acceptable discharge limits are attained.

BRIEF DESCRIPTION OF THE DRAWINGS

The accompanying drawing illustrates the preferred embodiments of the invention in which.

DESCRIPTION OF THE PREFERRED EMBODIMENT

Figure 1:
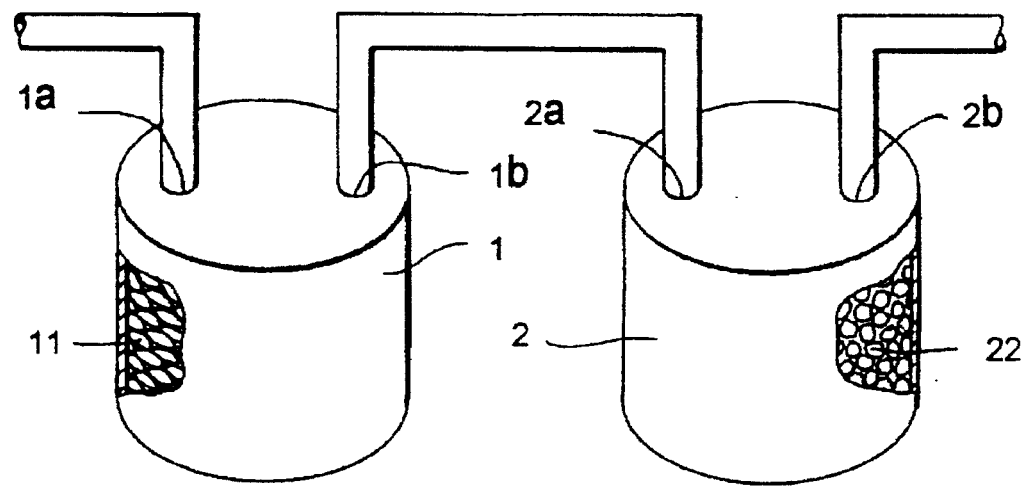
FIG. 1 is a schematic diagram of the preferred embodiment of this invention.

In FIG. 1, a diagram of an apparatus for conducting a method of extracting organic compounds from air and water columns is shown. This apparatus may accept a feed stream of free floating, suspended or emulsified organic contaminants which enters an inlet port 1a of a first filtering container 1 having a stratified arrangement of absorbent devices 1 enclosed therein. The feed stream passes through the first filtering container and exits an outlet port 1b to thereafter be exposed to an arrangement of activated carbon 22 enclosed within a separate, second filtering container 2. The fluid exiting the first container passes through the second container between inlet port 2a and outlet port 2b. The feed stream is discharged from the outlet port of the second container for release into the environment.

Pretreatment of the feed stock may be desirable to extract any free floating and easily recovered organics in the fluid column. This may be accomplished through a wide range of separation units that utilize gravity, skimming, centrifugal, coalescing or other properties to remove the readily recoverable organic compounds from the fluid column. The extraction of the large concentration volumes of organic contaminants allows the collected contaminants to be recycled, and further serves to prolong the life of the filtration media, thereby increasing the efficiency of the removal of organic contaminants from the fluid column. A prefilter may be installed to screen out large solid contaminants before they enter the separator. A particle filter may be utilized to collect loose particles in the feed stream, such as dirt, rust or soot.

The method may be used to treat organics of relatively low concentration levels in fluid columns. The composition of the organic compounds and metals found in the feed stream, the level of concentration of the organic compounds and metals in the feed stream and the length of time the feed stream is exposed to the filtration media, along with the ambient temperature of the feed stream and the components utilized in the process, are the most critical factors in determining the rate of absorption and the amount of time required to solidify the broad spectrum of organic contaminants and metals this method is designed extract from the feed streams for recovery and disposal. To enhance the effectiveness of the interaction of the solidifying polymer with the organic pollutants and metals in the feed stream, this method may utilize the alternate layering of the solidifying polymer-based filtration media and the coalescing layers that compose the stratified arrangement within the filtering containers.

Figure 2:
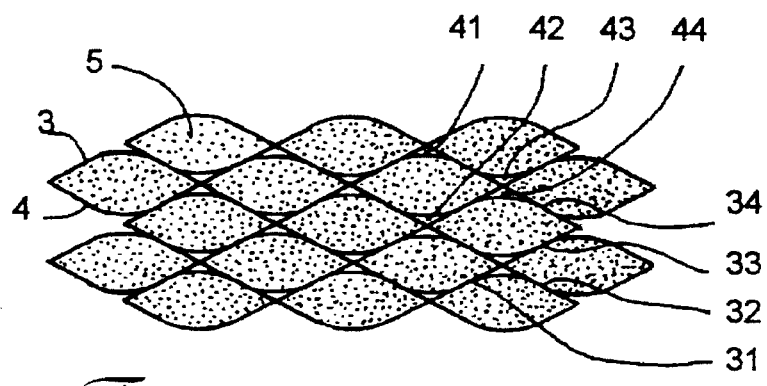
FIG. 2 shows a cross section of a stratified arrangement of the absorbent devices of the first embodiment of the present invention; indicating a plurality of chambers of the polymer material separated by the individual bags of textile material with each bag forming a distinct absorption unit, the consolidation points of the stratified layers of individual polymer-filled bags and the flow channels created by the stratified arrangement.

As shown in FIG. 2, the placing of a plurality of absorbent devices in a stratified arrangement creates a series of continuous consolidation points 31, 32, 33, and 34 of the stratified layers of individual polymer-filled bags. A number of flow channels 41, 42, 43, and 44 are created by the stratified arrangement. These flow channels, located in areas where the polymer-filled bags do not come in contact with each other, allow the feed stream to filter through the stratified arrangement.

Placement of the absorbent devices in this arrangement renders a significant amount of surface area exposure of the textile material to the feed stream as it filters through the container, providing the organic compounds and metals in the feed stream with numerous contact points 3 and 4 with the textile material. The textile material sorbs the organics from the feed stream and holds the organics in its web of fibers, allowing the solidifying polymer 5 to absorb the organics from the textile material and solidify them, removing the organic contaminants from the feed stream.

Figure 3:
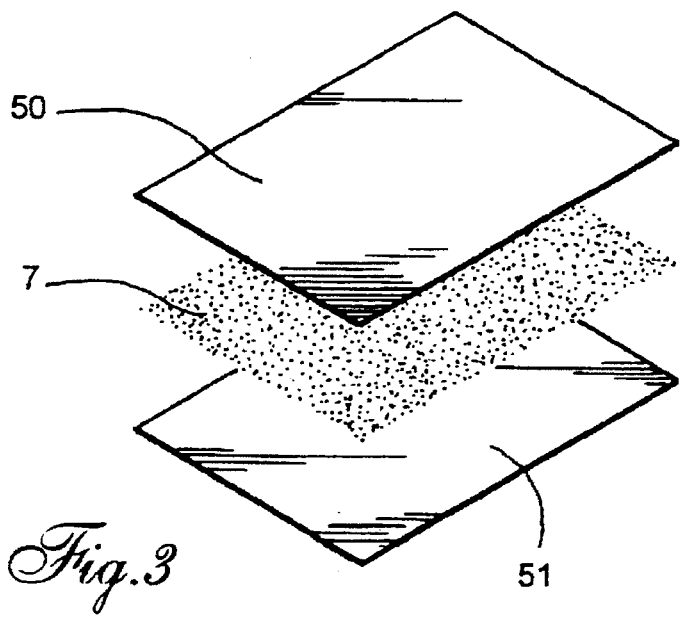
FIG. 3 is an exploded illustration of an absorbent device of the second embodiment of the present invention, indicating a preferably evenly distributed layer of polymer suspended between two layers of textile material prior to the polymer being bonded within the fibers of the textile material.

FIG. 3 is an exploded illustration of an absorbent device of the second embodiment of the present invention, indicating a preferably evenly distributed layer of polymer 7 suspended between two layers of textile material 50 and 51 prior to the polymer being bonded within the fibers of the textile material. Packaging the solidifying polymer in this way provides these absorbent devices with characteristics similar to those of the polymer-filled bags shown in FIG. 2. Placement of these absorbent devices within a container in a similar stratified arrangement creates a comparable series of continuous consolidation points and flow channels as shown in FIG. 2.

The stratification design allows for optimum efficiency in utilizing the solidifying properties of the polymer. Light viscosity organic compounds react almost instantaneously with the polymer and are exposed to no more polymer than can be fully utilized for absorption and solidification. Stratification promotes migration and suspension of light viscosity organics throughout the textile material portion of the absorbent device while slowing the rate of exposure of the polymer to the light viscosity organics.

The stratification of the distinct organic absorbing and solidifying units within the filtering container provides maximum surface area contact of the feed stream with the solidifying polymer-based filtration media via the multiple flow channels created within the container. This results in greater retention time and surface area contact of the free floating, suspended or emulsified organic contaminants with the textile material and solidifying polymer for an efficient rate of absorption and solidification. In addition, the stratification design allows organic compounds found in the feed stream to migrate throughout the stratified layers of textile material and be suspended within the textile material until the solidifying polymer can absorb them and begin the solidification process.

The properties of the textile material allowing the rapid absorption and migration of all viscosities of organic compounds found in the feed streams effectively gives the method a means of providing maximum surface area exposure of the solidifying polymer to the organic contaminants through the stratification design.

In accordance with the first embodiment of the present invention directed to a method and apparatus for separating suspended or emulsified organic compounds from air or water columns, each individual polymer-filled bag contains preferably 12 grams by weight of the solidifying polymer material within a preferable single layer envelope of 1.0 ounce textile material measuring preferably 4.25"×2.75". The textile material is preferably a petro-chemical based fabric such as polypropylene, polyester or nylon with a density of preferably 1.0 ounce per square yard. The polymer material is preferably an organic elastomer polymer such as polynorbornene, sold under the trademark Waste-Set 3200, Waste-Set 3400, Nochar A610, Nochar A650, Enviro-Bond 403, Norsorex APX1, H-100 Environmental Spill Encapsulant or an equivalent.

In accordance with the second embodiment of the present invention directed to a method and apparatus for separating suspended or emulsified organic compounds from air or water columns each layer of polymer, such as polynorbornene, suspended within a textile material contains preferably 12 grams by weight of the solidifying polymer material within a single layer of textile material, preferably a petro-chemical based fabric such as polypropylene, measuring approximately 12.0"×12.0". The textile material preferably has a density of 5.5 ounces per square yard. The polymer material is preferably an organic elastomer polymer such as polynorbornene, sold under the trademark Waste-Set 3200, Waste-Set 3400, Nochar A610, Nochar A650, Enviro-Bond 403, Norsorex APX1, H-100 Environmental Spill Encapsulant or an equivalent.

In accordance with the third embodiment of the present invention directed to a method and apparatus for separating suspended or emulsified organic compounds from air or water columns, each stratified pillow measures 48"×6"×½". Each pillow chamber contains preferably 8 grams by weight of the solidifying polymer for a preferable total weight of 1008 grams of polymer in the pillow. The textile material is preferably a petro-chemical based fabric such as polypropylene, polyester or nylon. The polymer material is preferably an organic elastomer polymer such as polynorbornene, sold under the trademark Waste-Set 3200, Waste-Set 3400, Nochar A610, Nochar A650, Enviro-Bond 403, Norsorex APX1, H-100 Environmental Spill Encapsulant or an equivalent.

In accordance with the fourth embodiment of the present invention directed to a method and apparatus for separating suspended or emulsified organic compounds from air or water columns, the preferable blend of polymer and other materials forming one pound of the polymer-based filtration media is comprised of a mixture of 10.5 ounces of the solidifying polymer material and 5.5 ounces of the other filtering or coalescing materials, preferably a substance such as ground-up polypropylene rod, raw petro-chemical based pellets utilized in the manufacturing of a synthetic textile fabric materials or activated carbon. The polymer material is preferably an organic elastomer polymer sold under the trademark Waste-Set 3200, Waste-Set 3400, Nochar A610, Nochar A650, Enviro-Bond 403, Norsorex APX1, H-100 Environmental Spill Encapsulant or an equivalent. A blended mixture of solidifying polymer and activated carbon sold under the trademark Nochar A620, or an equivalent, may also be utilized.

Various components may be configured to provide a filtration system using a modular design, allowing each component to be sized and arranged to meet the requirements of a broad range of applications. Criteria utilized in configuring such a system includes volume and contamination level of the feed stream to be processed, desired flow rates and required discharge limits.

The system may be configured to operate unattended. Should the system require servicing or routine maintenance, a system control panel may have the capability of activating the components of the system, monitoring the components of the system, identifying the component of the system that may require attention and suspending operation of the system.

A holding tank may be utilized to contain the feed stream of organically contaminated fluid until such time it is desired to process it with the system. A pump may be utilized to move the feed stream from the holding tank to a separating unit. A float switch may be utilized in the system to activate the pump when the volume of the feed stock in the holding tank achieves a predetermined level where treatment of the feed stream is desired. Pump size may be determined by the desired flow rate and head pressure necessary to operate the system.

Pretreatment of the feed stream may be desired to increase the efficiency if the system. Suspended particle matter within the fluid column may be treated to facilitate their recovery or eliminate their suspended state within the fluid column. The addition of certain chemicals to the feed stream may result in the suspended particles settling to the bottom of the holding tank and out of the fluid column.

The feed stock may also be directed to pass between electrically charged plates, effectively giving the suspended particles an electrical ion charge. The assigning of an ionic charge to the suspended particles results in the suspended particles bonding to each other, resulting in the consolidation of the particles into larger segments of accumulated suspended particles, the larger segments of consolidated particles being easier to recover as the feed stream passes through the system.

A prefilter may be installed to screen out large solid contaminants before they enter the separator. The prefilter may be a coalescing-type device have the capability of being backwashed and reused, a device having a replaceable, disposable filtration element within a housing or other filtration devices. Certain filtration devices may extract large solid contaminants and solid particle matter from the feed stream while simultaneously coalescing small particles of organic contaminates into larger, more easily recoverable contaminant particles prior to passing the feed stock through a separating unit.

A separating unit may be utilized to extract any large volumes of readily recoverable organic contaminants, such as free floating oil, from the fluid column before the feed stream enters the filter container component of the system. This allows any readily recoverable contaminants to be recovered for recycling, and further serves to extend and prolong the life of the filter containers.

A sensor may be placed in the separator and connected to the control panel to indicate when the separator approaches a predetermined capacity for organic contaminant retention. The control panel may have the capability of suspending operation of the system when activated by the sensor in the separator, thus preventing excessive amounts of organic contaminants to pass into the filter container. The system operator may be alerted to the suspension of the operation of the system and the need to discharge the accumulated organics from the separating unit by the control panel. The separating unit may also be configured to automatically pump off the accumulated contaminants when a predetermined quantity of organics is detected by the sensor. The organic contaminants in the separating unit are then transferred from the separating unit to a container dedicated to the retention of the accumulated organic contaminants.

A particle filter, sized to the cleaning requirements and flow rate of the system, may be included in the in-line configuration to collect loose particles in the feed stream, such as dirt, rust or soot, that could otherwise clog the arrangement of the filtration media contained within the filter container.

An in-line flow sensor may be connected to the control panel to monitor the flow rate of the fluid column through the system. This connection allows the control panel to monitor the flow rate of the feed stream through the various components of the system and suspend operation of the system should the flow rate be restricted to a predetermined rate due to any components requiring cleaning, backwashing or replacing. An in-line flow meter may be utilized to record the flow rate of the fluid column through the system. Metering of the system maybe desired to schedule routine maintenance of system components or determine the volume of feed stock treated in individual applications of the system.

An arrangement of one or more filter containers further removes any remaining free, suspended and emulsified organics from the feed stream. A plurality of filtering containers may be utilized in an in-line and/or manifold configuration to achieve desired flow rates and discharge levels. The size, composition of filtration media and number of filter containers utilized in the in-line configuration may be varied to meet specific application requirements.

An in-line monitor may be located prior to the point of discharge of the treated fluid column to insure the treated feed stream contains acceptable levels of organic compounds and metals for release into the environment. In the event a fluid column may require additional treatment, it may be returned to the feed stock and reprocessed until acceptable discharge limits are attained.

Additional filtering containers containing other types of filtration media configured to extract other contaminants that may be found within the fluid column may be arranged in-line to further remove pollutants from within the feed stock. Chemicals such as chlorine or fluoride that may result in the improving of the quality of the fluid column may be added prior to the discharge of the feed stock.

A system control panel may have the capability of monitoring and activating the system's components such as the power supply, float switch, separating unit sensor, discharge monitor and remote alarm. It may further have the capability of monitoring the flow of the feed stream throughout the system via the flow meter, controlling the main pump and prompting the operator to drain organic contaminants from the separating unit. The control panel may also have the capability of activating the automatic pump-off feature of the separating unit and monitoring the volume of organic contaminants accumulated in the container dedicated to retaining organic contaminants, if so equipped, plus alerting the operator when the monitored flow rate via the flow sensor indicates the necessity to clean, backwash or replace the prefilter, particle filter or filtering container. Operation of the control panel may be initiated by utilizing a switch located on the panel or by a remote activation device.

The system may be mounted in a fixed location or placed on a skid or pallet, allowing it to be transported to a remote location, proximate a contaminated feed stream requiring treatment. The system may also be mounted on a vehicle, such as a truck or trailer or on a floating marine vessel, such as a barge or boat, further expanding the ability of the system to be placed in remote locations. The system may further be placed on a wheeled device, such as a hand truck or wagon, or a set of wheels may be incorporated into the configuration of the components of the system, allowing it to be manually relocated for use.

The previously disclosed deficiency of passing an organically contaminated feed stream through a volume of loose polymer which results in the incidence of surface blockage may be advantageously incorporated into the above system to restrict flow of the fluid column as a filtering container approaches its capacity to absorb and solidify organic contaminants passing through it. This may be accomplished by configuring the final stratified layer of filtration media within the filtering container as a layer of unpackaged, unblended solidifying polymer, loosely contained in the final layer of the stratified arrangement of polymer-based filtration media and coalescing layers.

The use of the separating unit in the initial phase of the filtration cycle may result in the discharge of a feed stream of relatively low concentrations of organic compounds from the separating unit, the discharged fluid column preferably containing 50–200 parts per million of organic contaminants. The remaining free, suspended and emulsified organic contaminants are extracted from the feed stream as the contaminated fluid column passes through the stratified layers of filtration media within the filter container. The filtration media in this stratified arrangement may be configured to prevent surface blockage and allow the fluid column to flow through the filtering container, even after the filtration media has reached it capacity to absorb and solidify the organic contaminants. When the alternate stratified layers of polymer-based filtration media reach their capacity to absorb and solidify organic contaminants, they merely serve as additional coalescing layers within the filtering container, providing cohesive consolidation of the organic contaminants within the feed stream and allowing the contaminants to pass through the filter containers.

Utilization of the surface blockage and accompanying flow rate restriction occurring when a contaminated feed stream is passed through a volume of loose solidifying polymer proves to be beneficial in the prevention of the discharge of a fluid column having an undesirable high concentration of organic contaminants. Discharge of a fluid column having an undesirable concentration of organic contaminants could otherwise occur after passing a contaminated feed stream through a filtering container of stratified layers of polymer-based filtration media packaged or blended to prevent surface blockage where the polymer-based filtration media had been used to its capacity to absorb and solidify organics compounds.

As the solidifying polymer-based filtration media approaches its capacity to absorb and solidify organic compounds, greater concentrations of organic contaminants are allowed to pass through the filtering container. The free floating, suspended and emulsified contaminants are further consolidated via the coalescing effect of the spent filtration media. The increased concentrations of organic contaminants are then exposed to the unpackaged, unblended solidifying polymer, loosely contained in the final layer of the stratified arrangement of polymer-based filtration media. As the increasing concentrations of organic contaminants come in contact with the solidifying polymer contained in the final layer of the stratified arrangement, their absorption and solidification begins to create a layer of surface blockage. As the layer of solidifying polymer continues to absorb and solidify into a layer of solidified organic contaminants, the flow rate correspondingly diminishes as the feed stream passes through the filtering container.

An in-line flow sensor connected to the control panel may have the capacity to continuously monitor the flow rate of the feed stream as it passes through the system until a predetermined rate of restricted flow is detected, at which time the control panel may suspend operation of the system and alert the operator to the restricted flow situation. The suspension of the system operation prevents the discharge of an organically contaminated fluid cole into the environment.

A system of this type may be utilized in a variety of situations where discharge limits are of prime concern. When utilized as a component of a closed loop system, such as pressure washing or automobile washing facilities, water run-off generated in the operation of such facilities may continuously be cleansed and recycled, providing an excellent water conservation opportunity.

Similar closed loop systems may be utilized in the extraction of organics from contaminated soil. Water, and various cleansing agents, if required, may be mixed with contaminated soil to float the organic contaminants out of the contaminated soil. Water may further be utilized to rinse the organics from the sand, gravel and dirt as the treated column passes through separating devices, such as screened shakers. The organically contaminated water column remaining at the end of the separating process may then be passed through the system to extract the organic contaminants from the water column, allowing the treated water column to be reused in additional contaminated soil cleaning procedures.

In certain instances, a sludge that is typically unacceptable for landfill disposal is created in the field by the combination of soil containing organic contaminants and water. A similar closed loop system may be utilized in the process of extracting the organic contaminants from the sludge. The same system, or a separate system, may further be utilized to treat the water portion of the sludge, allowing the treated water column portion of the sludge to be discharged into the environment.

The method may be utilized to extract organic contaminants from water streams prior to processing in a desalination unit, resulting in a more efficient utilization of the desalination equipment. Other candidate feed streams for use of this method of removing organic compounds include, but are not limited to, bilge and wastewater of marine vessels, rain water run-off at petrochemical plants, pipeline pump stations, airports, aviation fueling facilities, electric utility substations, rail terminals and truck maintenance facilities. Water trapped in fuel tank storage vaults located under the concrete pads of automobile service stations contains a variety of spilled and leaked hydrocarbons. The contaminated water may be accessed for treatment through monitor wells located in the fuel tank vault and discharged into the environment.

Exhaust emissions from marine vessels, automobile-type vehicles and other internal combustion engines, as well as condensate generated by air compressors, pipeline pumps and other similar devices provide other candidate feed streams.

Other feed stream candidates include organically contaminated waste streams generated in the pressure testing of annular conduits in petrochemical plants and pipelines. Run-off from offshore petrochemical exploration and production platforms, aviation, rail and trucking fueling terminals as well as marine fueling facilities are additional examples of candidates for use of this method.

Entities charged with containment and elimination of petrochemical spills and other means of pollution by organic compounds may benefit from utilization of this method and the various embodiments disclosed by further treating the discharge of large volume collection devices, such as skimming and other collecting apparatus, prior to discharge of the treated fluid column.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments which fall within the scope of the invention.

What is claimed is:

1. An apparatus for removing, containing, and collecting organic contaminants from a fluid column, comprising:

a container having an inlet port for receiving a feed stream of organic contaminants carried within a fluid column and an outlet port for discharging, as a processed feed stream, fluid from the container for release into the environment; and a plurality of absorbent devices arranged in stratification within the container to establish chambers of distinct organic compound absorption units, each absorbent device comprising an outer envelope layer of textile material having a plurality of stacked layers of textile material disposed within the envelope layer and forming a plurality of chambers in stratification with a polymer material having the property of absorbing and solidifying liquid hydrocarbons being disposed in each of the chambers, and a seam joinder of the envelope layer and the stacked layers wherein said plurality of stacked textile material layers dispersively conduct liquid hydrocarbons under capillary attraction throughout the interior of said envelope layer for absorption and solidification by said polymer.

2. An apparatus for removing, containing, and collecting organic contaminants from a fluid column, comprising:

a first container having an inlet port for receiving a feed stream of organic contaminants carried within a fluid column and an outlet port for discharging fluid from the first container;

a plurality of absorbent devices arranged in stratification within the first container to establish chambers of distinct organic compound absorption units, each absorbent device comprising an outer envelope layer of textile material having a plurality of stacked layers of textile material disposed within the envelope layer and forming a plurality of chambers in stratification with a polymer material having the property of absorbing and solidifying liquid hydrocarbons being disposed in each of the chambers, and a seam joinder of the envelope layer and the stacked layers wherein said plurality of stacked textile material layers dispersively conduct liquid hydrocarbons under capillary attraction throughout the interior of said envelope layer for absorption and solidification by said polymer;

a second container having an inlet port for receiving the fluid discharged from the first container and an outlet port for discharging, as a processed feed stream, fluid from the second container for release into the environment; and an amount of activated carbon material in a stratified arrangement within the second container.

* * * * *